United States Patent [19]

Wilson et al.

[11] 4,156,158
[45] May 22, 1979

[54] DOUBLE SERRATED PIEZOELECTRIC TRANSDUCER

[75] Inventors: Charles R. Wilson, Glen Burnie, Md.;
Robert H. Whittaker, Derry, Pa.;
John H. Thompson, Severna Park, Md.

[73] Assignee: Westinghouse Electric Corp., Pittsburgh, Pa.

[21] Appl. No.: 825,514

[22] Filed: Aug. 17, 1977

[51] Int. Cl.² ............................................. H01L 41/10
[52] U.S. Cl. ...................................... 310/369; 310/334
[58] Field of Search ........................ 310/327, 334–336, 310/357, 358, 367–369, 365, 366

[56] References Cited

U.S. PATENT DOCUMENTS

| | | | |
|---|---|---|---|
| 2,479,926 | 8/1949 | Gravley | 310/366 X |
| 2,479,987 | 8/1949 | Williams | 310/366 X |
| 2,700,738 | 1/1955 | Havens | 310/327 X |
| 2,707,755 | 5/1955 | Hardie et al. | 310/327 |
| 2,716,708 | 8/1955 | Bradfield | 310/367 X |
| 2,875,354 | 2/1959 | Harris | 310/336 X |
| 3,036,231 | 5/1962 | Henry | 310/367 X |
| 3,059,130 | 10/1962 | Robins | 310/365 X |
| 3,114,849 | 12/1963 | Poschenrieder | 310/365 |
| 3,854,060 | 12/1974 | Cook | 310/367 X |

Primary Examiner—Mark O. Budd
Attorney, Agent, or Firm—D. Schron

[57] ABSTRACT

A disc of piezoelectric ceramic with a plurality of parallel slots cut into a top surface. Another plurality of slots is cut into the bottom surface of the disc with the parallel slots on the top being perpendicular to the parallel slots on the bottom. For one application a shallow keyway slot is cut into the top and/or bottom surface, traversing the already cut slots, to serve as a receptacle for an electrode ribbon.

14 Claims, 20 Drawing Figures

DOUBLE SERRATED PIEZOELECTRIC TRANSDUCER

BACKGROUND OF THE INVENTION

1. Field of the Invention

The invention in general relates to electroacoustic transducers, and particularly to a technique for eliminating unwanted mode resonances.

2. Description of the Prior Art

A piezoelectric transducer will provide an acoustic signal in response to excitation by electrical energy. The frequency of the output signal will be a function of various parameters, one of which is the dimensions of the body of transducer material. For example, there are many applications for plate or disc transducers having a certain thickness and a certain transverse dimension, which for the case of a disc, will be its diameter.

For some applications the disc is shock excited with a step voltage waveform to transmit an acoustic pulse to receiving apparatus. The problem arises, however, in such operation in that mode interaction causes unwanted acoustic energy in the bandwidth of interest. For example, as the ratio of the thickness of the disc to its diameter increases there results an unwanted radial mode resonance responding to the shock excitation to the same degree as the desired thickness mode resonance. This interaction can at times be so severe as to significantly reduce the accuracy of the system in which the transducer is utilized.

In order to eliminate unwanted modes of oscillation, several prior art tranducers utilize piezoelectric elements having a first series of grooves cut into a major surface thereof with a second series of grooves cut into the same surface, at right angles to the first series of grooves so as to form in the major surface a two-dimensional array of posts.

With such structures, electrical contact may be made to the flat surface of the piezoelectric element with relative ease, however the adequate attachment of electrode means to all of the upstanding posts may present a difficult and time-consuming problem. In addition, by the nature of the cuts in the piezoelectric element, an unsymmetrical thermal expansion may be experienced which will bend or warp the element in an unwanted manner.

In another type of prior art transducer, a series of grooves are cut at right angles to each other not only in a first surface but additionally, in an opposite surface; however, the arrangement is potted in an epoxy for the purpose of widening the bandwidth of the transducer.

SUMMARY OF THE INVENTION

The present invention greatly reduces or eliminates unwanted vibration and noise response in a transducer arrangement and does so with significantly less electrode connections to be made than those prior art transducers previously described. In addition, the resulting piezoceramic element utilized in the present invention is constructed and arranged to have symmetrical expansion thus reducing the tendency for buckling or warping. This is accomplished in the present invention by providing a body of transducer material having first and second opposed surfaces with a first plurality of slots cut into the first surface and a second plurality of slots cut into the second and opposite surface in a manner that only a single series of slots is cut into the respective surfaces for reducing the vibration and noise response in all directions other than the thickness mode.

Depending upon the application, a shallow keyway slot may be cut into each surface transversely of the slots already cut therein so as to receive an electrode ribbon for making electrical contact to the transducer material.

Where the transducer is to be placed into a holder having an acoustic window, a material similar to the transducer material, however, being unpoled, may then be placed over a surface of the electroded transducer to electrically isolate it from, and acoustically couple it to the acoustic window of the holder.

DESCRIPTION OF THE PREFERRED EMBODIMENT

Figure 1:
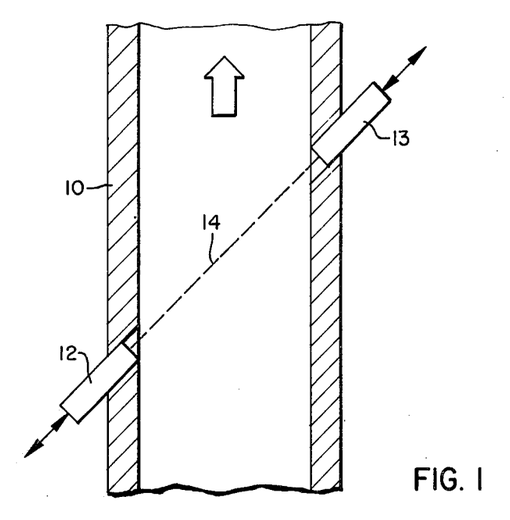
FIG. 1 is a sectional view of flowmeter apparatus in which the present invention is applicable.

In FIG. 1 pipe section 10 has fluid (liquid or gas) contained therein flowing in the direction of the arrow. In order to obtain an accurate indication of fluid flow, opposed transducer units 12 and 13 are positioned within apertures in pipe section 10 for the projection of acoustic energy toward one another along the common path 14.

Figure 2:
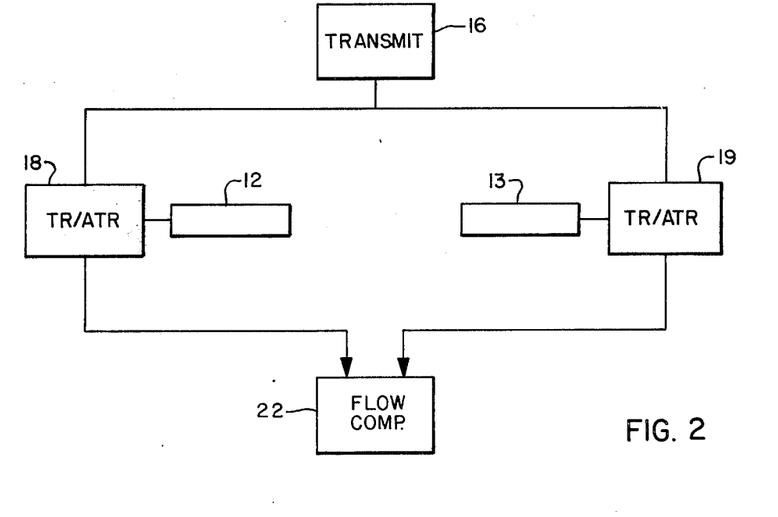
FIG. 2 is a block diagram of the components of a typical flowmeter.

FIG. 2, illustrating one type of flowmeter system, includes a transmitter 16 which simultaneously provides an electrical pulse to transducer units 12 and 13 through respective transmit-antitransmit (TR/ATR) switches 18 and 19. As a result thereof an acoustic pulse is transmitted downstream by transducer unit 12 concurrently with the projection of an acoustic pulse upstream by transducer unit 13. Since the downstream traveling pulse is aided by fluid flow, it will arrive first, and the difference in time arrivals of the downstream projected pulse and upstream projected pulse, as detected by their leading edges will provide an indication of fluid flow.

The received pulses are provided, through respective TR/ATR switches 18 and 19 to flow computation network 22 where the flow computation is performed.

Figure 3:
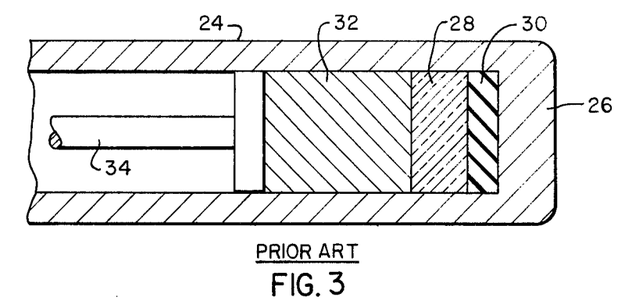
FIG. 3 is a sectional view through a typical transducer unit for a flowmeter application.

A sectional view of a transducer unit is illustrated in FIG. 3. The unit includes a cylindrical holder 24 (the forward end being shown) which is inserted into a predrilled hole in a pipe section and secured thereto. The holder has an acoustic window 26 which is in acoustic communication with the fluid under measurement, and located behind the window within the holder 24 is a piezoelectric ceramic disc transducer element 28. An insulating disc 30 is disposed between the electroded surface of transducer element 28 and window 26 while a backing mass 32 is disposed on the other side of the transducer element to absorb rearwardly projected acoustic energy. A spring loaded plunger assembly 34 acting on backing mass 32 insures that the components are in tight contact with one another and with the acoustic window.

Figure 4:
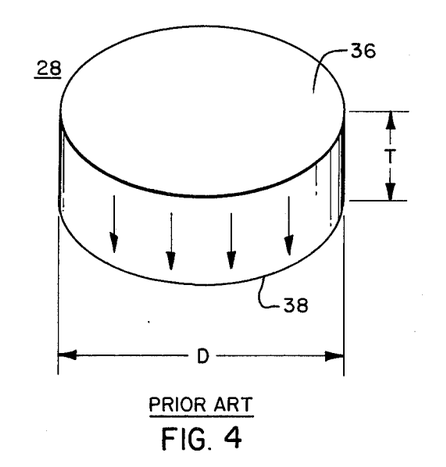
FIG. 4 is a view of a transducer active element.

The transducer element 28 is illustrated by itself in FIG. 4. The transducer element is made of a body of transducer material such as barium titanate or lead-zirconate-titanate which, during the manufacturing process, is poled in a direction as indicated by the arrows. The first and second opposed surfaces 36 and 38 are parallel to one another and are separated by a distance T which is a thickness dimension. The transverse dimension, for the case of the circular disc, is equal to the diameter D.

Figure 5:
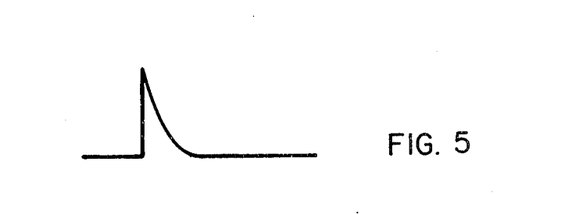
FIG. 5 is a waveform illustrating the electrical excitation of the flowmeter transducer.

Surfaces 36 and 38 are suitably silvered so that proper electrode contact may be made to the transducer element and the transducer element is provided with a step function of electrical excitation, as illustrated by the waveform of FIG. 5. As a result of this excitation, the transducer element resonates in various modes. For example, a primary desired mode would be the thickness mode wherein the first and second surfaces 36 and 38 cyclically move in opposite directions in response to the electrical input signal. The transducer, however, also operates in an unwanted radial mode, where the side wall of the transducer element moves in and out, causing unwanted acoustic energy in the bandwidth of interest which can prevent proper detection of the leading edge of the resultant received waveform.

Figure 6:
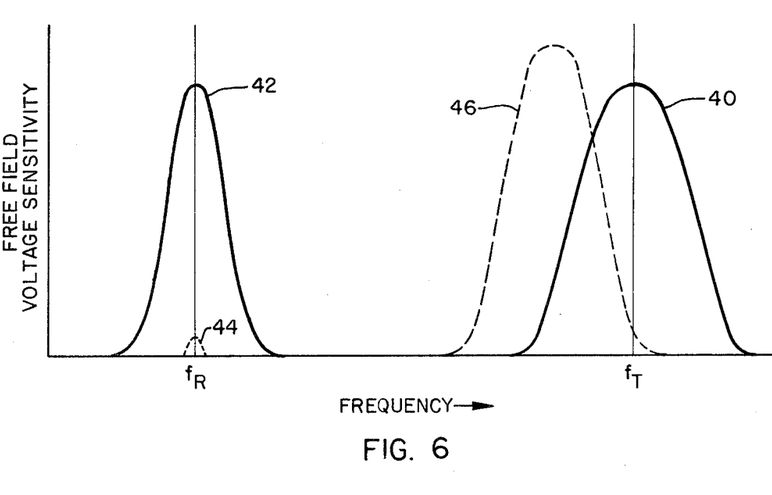
FIG. 6 are curves illustrating various modes of operation of the transducer element of FIG. 4.

The problem is illustrated by the curves of FIG. 6 wherein the frequency is plotted on the horizontal axis and free field voltage sensitivity is plotted on the vertical axis. Operation in the thickness mode produces a resonant frequency $f_T$ at which the response is a maximum, as illustrated by curve 40. Curve 42 illustrates a response due to a radial mode of resonance, the radial mode resonant frequency being designated $f_R$. The thickness mode resonance is a function of transducer material, a frequency constant and the thickness T of the transducer and to a good approximation, for example, for Navy I lead-zirconate-titanate materials is given by the formula:

$$f_T = 78/T$$

where $f_T$ is in kilohertz and T is in inches. For the same material the radial mode resonant frequency $f_R$ is approximately given by the equation:

$$f_R = 88/D$$

where $f_R$ is in kilohertz and diameter D is in inches. From these two equations it may be seen that the greater the diameter to thickness ratio the greater will be the separation between the desired and undesired resonances. In general, for a given diameter, the thicker the disc the lower will be the frequency of operation. For some applications where operation is in the megahertz region the disc may be extremely thin, thereby resulting in a relatively wide separation between $f_T$ and $f_R$. Operation at the higher frequencies, however, results in greater acoustic absorption by the transmitting medium, and if acoustic transmission is to be made across a very large pipe where the acoustic losses would be high, it would be more desirable to go to a lower frequency of operation. Since the hole in the pipe section should not be too large, the thickness to diameter ratio of the transducer disc increases, bringing on the intermode problem. With the present invention, and as illustrated by dotted curve 44, the radial resonant mode frequency spectrum is substantially reduced, if not entirely eliminated. As illustrated by dotted curve 46, the desired thickness mode spectrum decreases in frequency somewhat and increases in amplitude.

Figure 7:
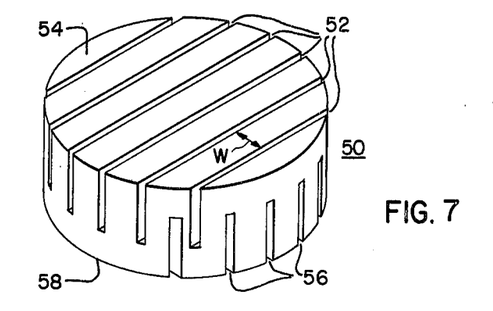
FIG. 7 is a view of one embodiment of the present invention.
Figure 7A:
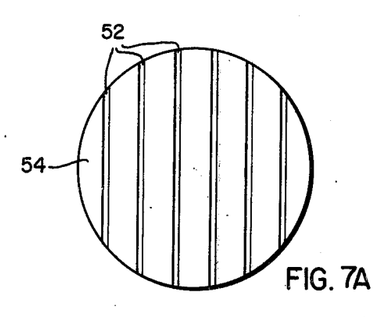
FIGS. 7A and 7B are respective views of the top and bottom surfaces of the element of FIG. 7.
Figure 7B:
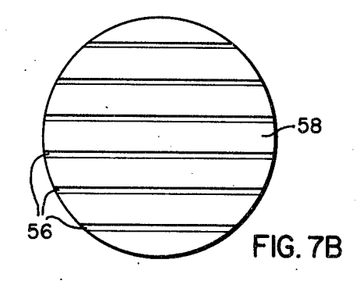

FIG. 7 illustrates one embodiment of the present invention, which by way of example will be described with respect to a disc, although it is to be understood that other shapes are equally applicable. Transducer element 50 is made of a body of poled transducer material such as lead-zirconate-titanate and has a first plurality of slots 52 cut into a first surface 54 and defining a plurality of land areas, each of width W. A second plurality of slots 56 is cut into an opposed second surface 58 at an angle relative to the first plurality of slots and in a preferred embodiment the slots are perpendicular to the first plurality as can be seen from FIGS. 7A and 7B illustrating a top view and bottom view respectively of the disc.

In a preferred embodiment the slots of the first plurality are parallel to one another and perpendicular to surface 54, and the slots of the second plurality are parallel to one another and perpendicular to surface 58. To do otherwise would result in trapezoidal-shaped posts of different sizes causing a change of $f_T$, with a non-uniform radiation from the surface of the transducer.

Since the slots are cut into both surfaces 54 and 58, any thermal expansion is substantially symmetrical thus reducing the possibility of warpage or buckling of the element during operation, as may be experienced by those devices of the prior art.

Figure 7C:
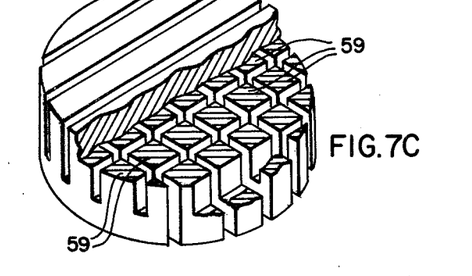
FIG. 7C illustrates the transducer of FIG. 7 with portions broken away.

The cutting arrangement provided herein maintains the same thickness but breaks up the radial mode of operation by dividing the body of transducer material into a plurality of decoupled posts. These posts may be seen in FIG. 7C which illustrates the transducer of FIG. 7 with portions broken away. It is seen that each post 5a extends between the first and second surfaces 54 and 58 and is arranged in a two-dimensional array.

Figure 8:
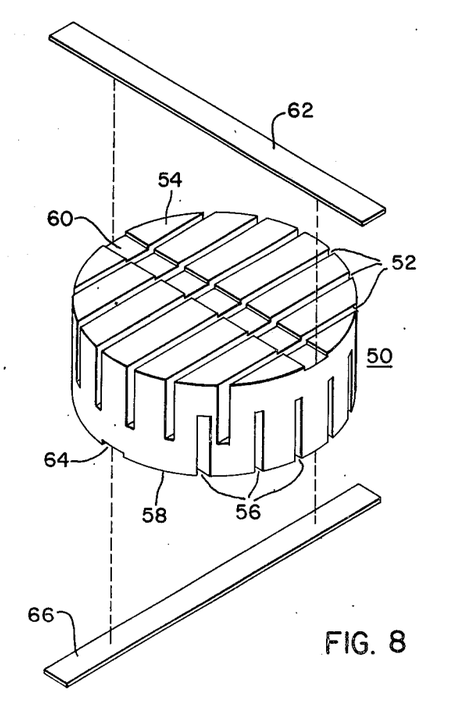
FIG. 8 is a view of the active element of FIG. 7 with provision for an electrode ribbon.

For the flowmeter application where the transducer element must be closely coupled to an adjacent component, it would be desirable to be able to eliminate an acoustic mismatch which may result in loss of acoustic energy transfer. To this end electrical connection may be made to the transducer of FIG. 7 by an arrangement as illustrated in FIG. 8. At least one surface, for example, surface 54, has a slot 60 cut into it with the slot running across the plurality of slots 52, and preferably along a diameter so that slot 60 is perpendicular to slots 52. Slot 60 is much shallower than slots 52, however, it is wider to accommodate an electrode ribbon 62 which may be affixed in slot 60 by means of conducting epoxy and which is of a length greater than the diameter of transducer 50 so that electrical connection may be made to the extending tab portion. Cutting of the slot 60 eliminates the electrical connection between the silvered surfaces on either side of the diametrical cut, however electrical continuity may be restored with the conducting epoxy and electrode ribbon.

If desired, or if required, a second shallow slot 64 on the second surface 58 may be provided, running transversely of slots 56 and perpendicular thereto to accommodate an electrode ribbon 66, which may be similarly adhesively sealed in place by means of a conducting epoxy. The thickness of electrode ribbons 62 and 66 is such that they fit into their respective slots without projecting above respective surfaces 54 or 58.

Thus it is seen that with the provision of the slot and electrode ribbon, proper electrical contact may be readily made to the transducer element. If the element is fabricated without the provision of the slot and ribbon arrangement, proper electrical connection, such as by soldering, would be made to the top surface land areas adjacent the slots. Thus for a six slot cut, electrode connections would be made to the seven land areas, five between the slots, and one on each end. It may be seen that with the prior art arrangements having a second series of slots cut perpendicular to the first series, on the same surface, it would require a total of 49 individual connections to the land areas (or posts). In general, with the present arrangement, electrical connection must be made to n posts whereas in the prior art electrical connection must be made to $n^2$ posts.

Figure 9:
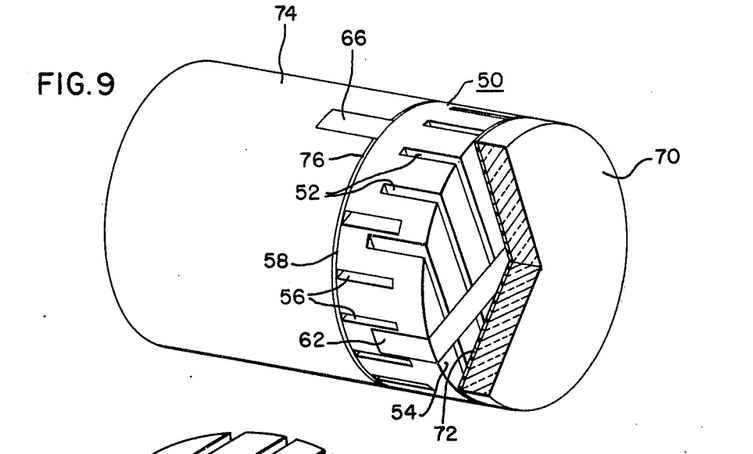
FIG. 9 illustrates the present invention for use in a flowmeter.

A transducer assembly using the arrangement of FIG. 8 is illustrated in FIG. 9. An acoustic coupling member 70 in the form of a disc with parallel front and rear surfaces is pressed into engagement with surface 54 of transducer 50 and is secured thereto by means of, for example, a thin layer of conducting epoxy 72. The second surface 58 of transducer 50 is connected to a backing member 74 also by means of a thin layer of conducting epoxy 76.

Figure 10:
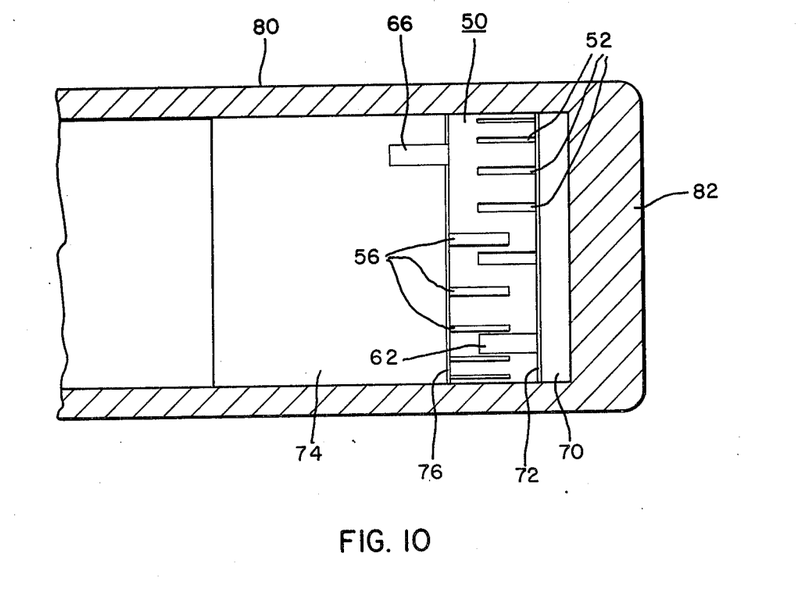
FIG. 10 is a sectional view of the apparatus of FIG. 9 in a holder.

The assembly may be placed, as illustrated in FIG. 10, in a cylindrical holder 80, having an acoustic window 82, similar to the arrangement of FIG. 3. As was the case with respect to FIG. 3, backing member 74 serves to absorb rearwardly projected acoustic energy while coupling member 70 serves to couple acoustic energy from the transducer to the acoustic window 82.

In order to couple acoustic energy from element 50 to the acoustic window 82 with minimal acoustic energy loss, coupling member 70 is made of a body of transducer material similar to the transducer element 50, however, in an unpoled condition so as not to provide any transducer action and yet match the mechanical characteristic acoustic impedance (density $\rho \times$ speed of sound $C \times$ area A) of the transducer element itself.

The characteristic acoustic impedance of the acoustic window 82 approximates that of the transducer element 50 and coupling member 70. However the match between the window and the fluid under measurement is such as to cause acoustic reflection at the window-fluid interface. This reflected energy could be trapped in the window if it were not matched to the piezoceramic elements. With the present arrangement, this reflected energy passes back through the coupling member 70, element 50, and is then absorbed by the backing member 74, which also has a characteristic acoustic impedance closely approximating that of the piezoceramic elements. For a typical backing element such as tungsten, its characteristic acoustic impedance may be somewhat lower than that of the transducer element. As an additional feature of the present invention the slicing of the transducer element has the effect of reducing its area A and the value for the speed of sound C in the element thereby reducing the characteristic acoustic impedance of the element to more closely approximate that of the backing member.

By way of an example an assembly as illustrated in FIG. 9 was fabricated and placed into a holder as illustrated in FIG. 10 with the unit then being placed into an automatic admittance meter to determine resonance. The transducer material was PZT-5A (Clevite Corp.), 0.5 inch in diameter and 0.25 inch in thickness. The slots of the first and second pluralities were each 0.01 inches wide and 0.2 inches deep with 6 slots being cut into each surface. The slots for the electrode ribbons were approximately 0.063 inches wide by 0.002 inches deep and the electrode ribbons were 0.06 inches wide by 0.001 inch deep.

Figure 11:
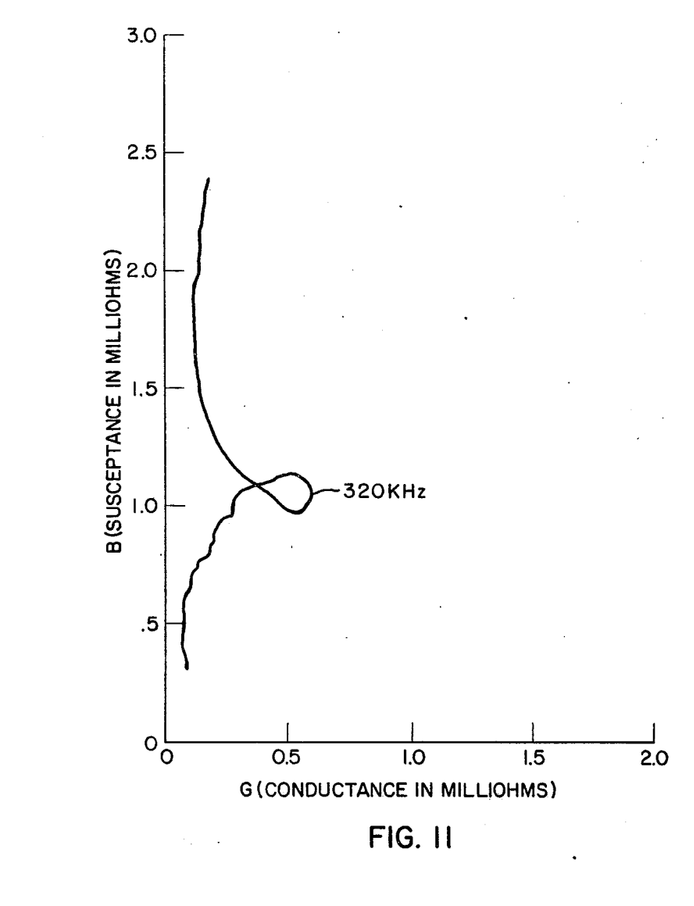
FIG. 11 is an admittance plot of the transducer arrangement illustrated in FIG. 10.

The admittance plot of the unit is illustrated in FIG. 11 wherein susceptance in milliohms is plotted on the vertical axis and conductance in milliohms is plotted on the horizontal axis. The admittance meter was a Dranetz model 202 which in response to a varying frequency input provides two output DC voltages, one proportional to conductance G and the other proportional to susceptance B. The output signals were provided to a standard X-Y recorder which plotted the curve illustrated in FIG. 11. In such admittance plot, a resonance is indicated when the curve loops around on itself, and particularly at the frequency where the loop has maximum conductance. The curve of FIG. 11 indicates a single loop (a single resonance) at 320 KHz.

Figure 12:
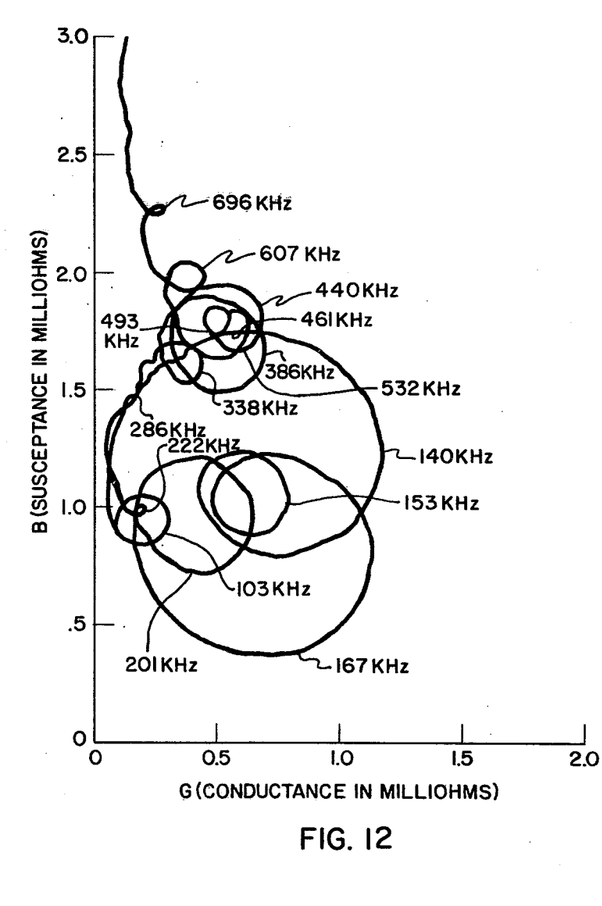
FIG. 12 is an admittance plot of a prior art transducer arrangement.

FIG. 12 is an admittance plot as in FIG. 11, however, with an unslotted transducer in the same holder arrangement as in FIG. 3. The curve of FIG. 12 illustrates a dramatic difference and significant improvement with the present invention. The curve of FIG. 12 illustrates that the unslotted transducer produces resonances at 103 KHz, 140 KHz, 153 KHz, 167 KHz, 201 KHz, 222 KHz, 286 KHz, 338 KHz, 386 KHz, 440 KHz, 461 KHz, 493 KHz, 532 KHz, 607 KHz, and 696 KHz.

A normal design frequency of operation of a transducer element will be modified when the element is cut in accordance with the teachings of the present invention. If a specific frequency range of operation is desired, a trial and error method may be implemented for determining certain variables. One design aid, by way of example, is illustrated by the family of curves in FIG. 13 wherein the vertical axis of the graph represents resonant frequency times thickness of the transducer element, in kilohertz-inches, and the horizontal axis represents the ratio of the width of land area W (as in FIG. 7) to thickness T of the transducer element.

Figure 13:
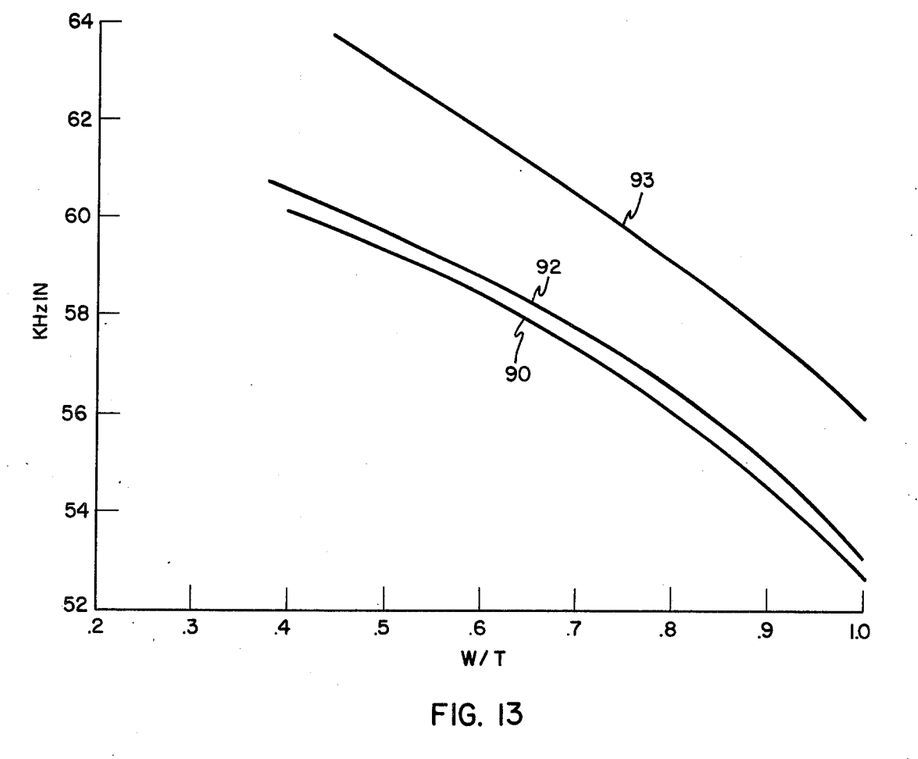
FIG. 13 illustrates a family of curves to and in the design of a transducer.
Figure 14A:
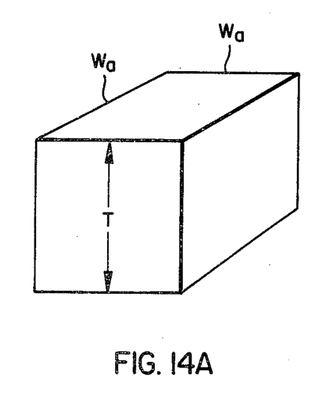
FIGS. 14A–14D illustrate different sized elements to be tested for generating curve 90 of FIG. 13.
Figure 14B:
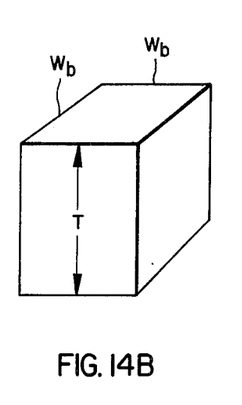
Figure 14C:
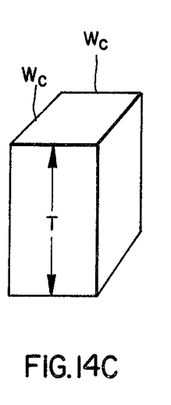
Figure 14D:
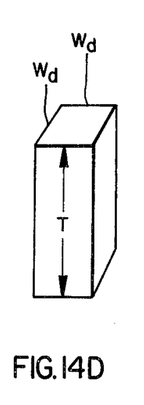

In order to establish curve 90 of FIG. 13, a sheet of piezoelectric ceramic was diced into several samples, as illustrated in FIG. 14A through 14D. All of the samples have the same thickness T but are of different square cross-sectional areas, the side of the sample in FIG. 14A being $W_a$, in 14B being $W_b$, in 14C being $W_c$, and in 14D being $W_d$. There is therefore established a W:T ratio (the horizontal axis of FIG. 13), for each sample.

The series resonant frequency of each sample was then measured by applying a constant voltage across the sample and sweeping the frequency until a maximum current was attained. That frequency at which maximum current is attained is the resonant frequency and this value multiplied by the thickness of the sample gives the second coordinate for one point of curve 90. The procedure was repeated with the remaining samples to define curve 90 having the general equation:

$$\text{kilohertz-inches} = 63.58 - 4.83(W/T) - 5.95(W/T)^2$$
$$\text{for } 0 < W/T < 1.5$$

The above formula was obtained by a computer program which fits the least square polynomial to bivariate data using an orthogonal polynomial method, one such program being available under the name of Polfit, a program of On-Line Systems, Inc., of Pittsburgh, Pa.

Curve 90 therefore represents an element in which the slices are made all the way through the element. The resulting structure would be impractical to handle and accordingly with curve 90 used as a base curve, remaining curves such as curve 92 for an 80% depth cut or curve 93 for a 60% depth cut may be generated. The 80% depth curve 92 will closely follow curve 90 but is displaced therefrom and may be obtained by slicing a first sample 80% of the way through (on both sides as in FIG. 7) and then slicing a second sample with a different width of land area to thickness ratio. Other curves of the family may similarly be generated; however, an 80% depth cut gives extremely satisfactory operation. The curves shown in FIG. 13 are for a lead-zirconate titanate piezoceramic material known as NAVY III.

Suppose, by way of example, that it is desired to design a transducer disc out of NAVY III material which will be operable at 200 kilohertz. Let it be assumed that the disc is one inch in diameter and that four cuts will be made to an 80% depth on both sides as previously described herein. If the width of each cut is 0.02 inch, the width of the resulting five land areas will be 0.184 inches.

Next, a W/T ratio is arbitrarily chosen, and let it be assumed that this value is 0.6. If W/T is 0.6, then from curve 92 of FIG. 13, the value of kilohertz-inches will be in the order of 58.8 kilohertz-inches. If W/T is 0.6 and W is 0.184, then the thickness T will be calculated to be 0.307 inches. When this divided into the value of 58.8, the resulting frequency is 191.5 kilohertz, a value somewhat below the design value of 200 kilohertz (but which in reality may be sufficient for intended use).

Next, a new W/T ratio is chosen, for example 0.7. The thickness then is calculated to be 0.262 inches. From curve 92 for a W/T ratio of 0.7, the value of kilohertz-inches is approximately 57.8 which if divided by the thickness results in a frequency of 219.8 kilohertz, somewhat higher than the design frequency.

A next W/T ratio, for example, 0.63 may be chosen resulting in a thickness of 0.292 inches and a value of kilohertz-inches of 58.1. This value, when divided by 0.292 results in a frequency of 199.9 kilohertz, which is very close to the desired 200 kilohertz. Therefore, with the particular piezoceramic material chosen, and with the four cuts, the thickness of the element should be cut to a value of 0.292 inches.

Thus, it is seen that for a particular piezo-ceramic material, a particular set of curves may be generated to assist in the design of the transducer. Where time and expense are of secondary importance, a greater number of samples may be generated with different depth cuts and with different land area widths W to generate curves of even greater accuracy.

Although the previous example solved for a particular thickness of transducer element, it is possible to reverse the procedure and with a given thickness, determine how many cuts there should be in the transducer element to obtain a predetermined desired operating frequency.

We claim:

1. A transducer comprising:
   (A) a body of poled transducer material having first and second opposed surfaces;
   (B) a first plurality of slots cut into said first surface for a distance of greater than 50% of the way to said second surface;
   (C) a second plurality of slots cut into said second surface for a distance of greater than 50% of the way to said first surface and at an angle relative to said first plurality of slots;
   (D) said cuts forming a plurality of posts between said surfaces and arranged in a two-dimensional array;
   (E) there being no more than one slot cut transversely to said first plurality of slots, in said first surface;
   (F) there being no more than one slot cut transversely to said second plurality of slots, in said second surface.

2. Apparatus according to claim 1 wherein
   (A) the slots of said first plurality are parallel to each other.

3. Apparatus according to claim 2 wherein
   (A) the slots of said second plurality are parallel to each other.

4. Apparatus according to claim 3 wherein
   (A) the slots of said first plurality are perpendicular to the slots of said second plurality.

5. Apparatus according to claim 1 wherein:
   (A) said first surface includes a first electrode receiving slot cut transversely to said first plurality of slots, but of a shallower depth; and
   (B) a first electrode ribbon in said first electrode receiving slot for making electrical contact with said transducer material and extending laterally beyong said first surface.

6. Apparatus according to claim 5 wherein
   (A) the width of cut of said single slot is greater than the width of cut of any of said first plurality of cuts.

7. Apparatus according to claim 5 wherein
   (A) the slots of said first plurality are parallel to each other; and
   (B) said first electrode receiving slot is perpendicular to said first plurality of slots.

8. Apparatus according to claim 5 wherein
   (A) said second surface includes a second electrode receiving slot cut transversely to said second plurality of slots, but of a shallower depth; and which includes
   (B) a second electrode ribbon in said second electrode receiving slot for making electrical contact with said transducer material and extending laterally beyond said second surface.

9. Apparatus according to claim 5 wherein
   (A) the slots of said second plurality are parallel to each other; and
   (B) said second electrode receiving slot is perpendicular to said second plurality of slots.

10. Apparatus according to claim 1 wherein
    (A) said first and second opposed surfaces are parallel to each other.

11. Apparatus according to claim 10 wherein (A) the slots of said first plurality are cut perpendicular to said first surface.

12. Apparatus according to claim 10 wherein
(A) the slots of said second plurality are cut perpendicular to said second surface.

13. Apparatus according to claim 1 wherein
(A) said first plurality of slots are evenly spaced.

14. Apparatus according to claim 13 wherein
(B) said second plurality of slots are evenly spaced.

* * * * *